United States Patent [19]

Notelteirs

[11] 4,314,176
[45] Feb. 2, 1982

[54] HALOGEN INCANDESCENT LAMP

[75] Inventor: Victor R. Notelteirs, Eindhoven, Netherlands

[73] Assignee: U.S. Philips Corporation, New York, N.Y.

[21] Appl. No.: 71,802

[22] Filed: Sep. 4, 1979

[30] Foreign Application Priority Data

Sep. 13, 1978 [NL] Netherlands ............... 7809301

[51] Int. Cl.³ .............................................. H01K 1/50
[52] U.S. Cl. ...................................... 313/185; 313/222
[58] Field of Search ............................. 313/222, 185

[56] References Cited

U.S. PATENT DOCUMENTS 3,418,512 12/1968 T'Jampens et al. .............. 313/185
3,431,448 3/1969 English ........................ 313/222 X Primary Examiner—Palmer C. Demeo
Attorney, Agent, or Firm—Robert S. Smith

[57] ABSTRACT pg,1 The prior art voltage halogen incandescent lamps destined for use as photolamps have a high operating gas pressure (to reduce filament evaporation) and, hence, present an explosion hazard lamps of the type according to the invention have a gas filling which during operation has a relatively low pressure between 0.8 and 1 bar; eliminating the hazard and thereby enabling them to be housed in considerably smaller and lighter luminaires.

1 Claim, 1 Drawing Figure

U.S. Patent     Feb. 2, 1982     4,314,176
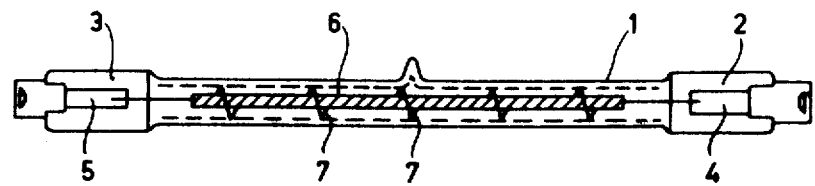

HALOGEN INCANDESCENT LAMP

The invention relates to a line voltage halogen incandescent lamp having a tubular lamp envelope and a filament stretched axially therein, the lamp envelope filling comprising an inert gas containing hydrogen bromide.

Such a lamp is commercially available for illuminating scenes to be photographed. The known lamp requires a rigid luminaire closed by a strong cover glass so as to achieve safety of the lamp in operation. The gas pressure in the known lamp in operation is some ten bars, so that, if the lamp envelope explodes, hot fragments of the lamp envelope can be flung away with great force. The cover glass of the luminaire serves to prevent said fragments from injuring persons or causing damage to property. In this case, however, the cover glass should be a fair distance away from the lamp, which involves a bluky luminaire, a restricted beam width, and a high price.

It is the object of the invention to provide a lamp for illuminating scenes to be photographed, which lamp may be used in a luminaire without a cover glass and hence enables the use of slim fittings having a large angular aperture.

According to the invention, this object is achieved in lamps of the kind mentioned in the opening paragraph in that the pressure of the gas mixture during operation of the lamp lies between 0.8 and 1 bar. Although in practice a gas filling of a few bars at room temperature is always used in halogen incandescent lamps including photolamps, so as to reduce the evaporation of the filament, it has been surprisingly found that when gas of the said low operating pressure is used a sufficiently long life can be achieved in spite of a high filament temperature ($>3300°$ K.) without premature blackening of the lamp envelope.

The gas pressure of a lamp in operation depends inter alia on the filling pressure of the lamp, i.e. the gas pressure at room temperature, the volume of the lamp envelope, the power consumed by the lamp and the ambient temperature. The filling pressure necessary to realize a gas pressure lying in the described range during operation of the lamp can easily be determined for each type of lamp, for example, by means of the method described in the Netherlands Tijdschrift voor Natuurkunde 6 77-88 (1939). In this method, a narrow glass tube is sealed to the lamp envelope in open communication with the lamp volume at one end and is sealed at its other, free, end. The bore of the tube is divided into two parts by means of a drop of mercury. The gas pressure in operation can be calculated by comparing the location of the drop of mercury in the cold condition with the location during operation of the lamp.

The gas pressure at room temperature of the lamp according to the invention will generally be between 13/76 and 17/76 bars. The gas preferably contains 3 to 4% by volume of hydrogen bromide.

An embodiment of the lamp according to the invention will now be described by way of an example and with reference to the accompanying drawing which shows an elevation of such a lamp.

In the drawing 1 denotes a quartz glass lamp envelope which is sealed by pinches 2 and 3 in which molybdenum foils 4 and 5 are present. A filament 6 is stretched between said foils and is centered in the lamp envelope by supporting members 7.

EXAMPLE

A 220 V 1000 W photolamp according to the invention had a quartz lamp envelope, inside diameter 8.5 mm, and inside length of 87 mm. The lamp envelope was filled with 0.2 bar at room temperature of a gas mixture consisting of 8% by volume of nitrogen, 3.5% by volume of HBr, and 88.5% by volume of argon. During operation of the lamp, the internal gas pressure was between 0.5 and 1.0 bar. At a color temperture of $3400°$ K. the lamp had an efficiency of 34 lm/W.

The filament was fused by means of a laser during operation. This did not result in explosion of the lamp envelope.

What is claimed is:

1. A line voltage halogen incandescent lamp having a tubular lamp envelope and a filament stretched axially therein, the lamp envelope filling comprising an inert gas and hydrogen bromide, characterized in that the pressure of the gas mixture during operation of the lamp is between 0.8 and 1 bar.

* * * * *